(12) United States Patent
Ponnuswamy (10) Patent No.: US 8,453,015 B2
(45) Date of Patent: May 28, 2013

(54) MEMORY ALLOCATION FOR CRASH DUMP

(75) Inventor: Basker Ponnuswamy, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1011 days.

(21) Appl. No.: 12/174,194

(22) Filed: Jul. 16, 2008

(65) Prior Publication Data

US 2009/0024820 A1 Jan. 22, 2009

(30) Foreign Application Priority Data

Jul. 16, 2007 (IN) .......................... 1524/CHE/2007

(51) Int. Cl.
*G06F 11/00* (2006.01)

(52) U.S. Cl.
USPC ..................................................... 714/38.11

(58) Field of Classification Search
USPC ............ 714/38.11, 38.1, 38.12, 38.13, 38.14, 714/45; 717/124, 128
See application file for complete search history.

(56) References Cited

U.S. PATENT DOCUMENTS

| | | | | |
|---|---|---|---|---|
| 5,226,157 A * | 7/1993 | Nakano et al. | ................. | 711/162 |
| 5,293,612 A * | 3/1994 | Shingai | ........................ | 711/159 |
| 6,543,010 B1 * | 4/2003 | Gaudet et al. | .................... | 714/45 |
| 6,687,799 B2 * | 2/2004 | Smullen et al. | ................ | 711/154 |
| 7,707,462 B1 * | 4/2010 | Harris | .......................... | 714/47.2 |
| 7,831,857 B2 * | 11/2010 | Muppirala et al. | ............ | 714/5.11 |
| 2002/0029359 A1 * | 3/2002 | Kiyoi et al. | ...................... | 714/45 |
| 2004/0025093 A1 * | 2/2004 | Willy et al. | ...................... | 714/54 |
| 2006/0041739 A1 * | 2/2006 | Iwakura et al. | .................... | 713/2 |
| 2006/0069944 A1 * | 3/2006 | Oguma | ............................. | 714/5 |
| 2006/0156057 A1 * | 7/2006 | Babu | ................................. | 714/5 |

FOREIGN PATENT DOCUMENTS

WO    WO 2006090407 A1 *    8/2006

* cited by examiner

*Primary Examiner* — Scott Baderman
*Assistant Examiner* — Joseph Kudirka (57) ABSTRACT

A method and module for performing a crash dump in a data processing apparatus in which memory for running the crash dump routine is allocated at the time of the crash. The method comprises running a first routine to identify memory locations of data for use by a second routine; allocating memory for performing the second routine from a memory range that does not contain the identified memory locations; and running the second routine using the allocated memory, wherein the first routine comprises a dummy crash dump routine and the second routine comprises a crash dump routine. The dummy crash dump may use smaller data sizes and does not perform any input or output to non-volatile storage of the data to be dumped. When a memory range that is safe to be reused has been identified, the data stored therein can be dumped and then memory for performing the actual crash dump routine can be allocated from the memory range and be reused for performing the actual crash dump routine.

20 Claims, 7 Drawing Sheets

MEMORY ALLOCATION FOR CRASH DUMP

RELATED APPLICATIONS

This patent application claims priority to Indian patent application serial number 1524/CHE/2007, having title "Memory allocation for crash dump", filed on 16 Jul. 2007 in India (IN), commonly assigned herewith, and hereby incorporated by reference.

BACKGROUND OF THE INVENTION

Most operating systems have a procedure for saving the contents of the physical memory to non-volatile storage at the time of a crash to make it easier for engineers to later identify the cause of the crash. This procedure is normally carried out by a subsystem in the kernel. When the kernel crashes, for example as a result of a fatal error in one of the programs it is running, the crash dump routine reads the content of the physical memory and writes it to a stable storage like a dedicated internal disk or over a network to an external device. Engineers can later run kernel debuggers on the stored data, the dump.

Memory is required to run the crash dump. Conventionally, an area of the memory is allocated at boot-up of the system for this purpose. However, when the entire memory for running the crash is allocated at boot-up, the allocated memory cannot be used for other purposes during run-time. This results in an inefficient use of the memory resources available. The problem is made even worse in operating systems using more advanced crash dump routines which make use of compression, parallel input/output and dump via network because they have higher memory requirements and, therefore, even more memory is unavailable for other purposes during runtime. Additionally, the amount of memory required to perform the crash dump is, in some circumstances, easier to identify at the time of the crash than at boot-up.

There have been attempts to overcome the above problems. For example, the HP-UX™ operating system allocates the memory for performing the dump at the time of the crash and not at run-time. The technique used by this operating system to find memory to use at the time of crash involves keeping track of what type of data each page in memory stores. The kernel classifies each page in physical memory according to its usage and at crash time it can easily identify those pages that belong to a class of pages which is safe to reuse. A problem with this technique is that the records for keeping track of the class to which each page belongs take up a large portion of the available memory.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
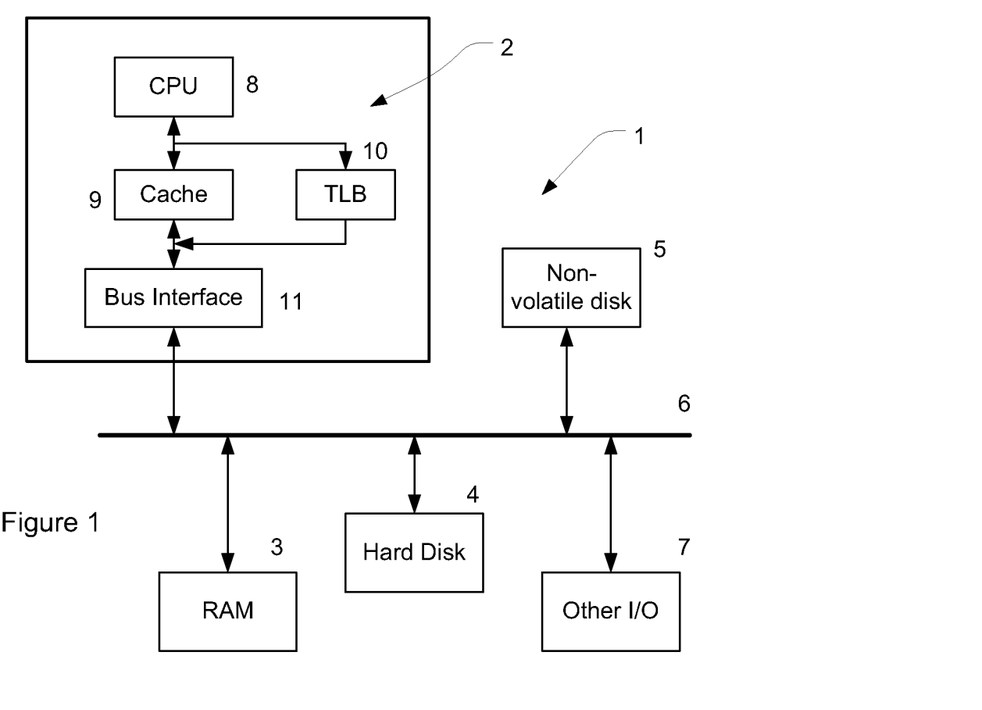
FIG. 1 is a schematic diagram of a data processing system.

FIG. 1 is a schematic diagram of a processing system 1, such as a server or a workstation. It comprises a processor 2, a main memory 3, for example in the form of dynamic RAM, a hard disk 4 and an additional non-volatile disk 5, interconnected by a bus 6. The non-volatile disk 5 may be used for saving the physical data at the time of a crash. The system typically also includes a variety of other input/output (I/O) subsystems 7 required for operation of the system, as would be apparent to a person skilled in the art. The processor comprises a central processing unit CPU 8, an internal cache memory 9, a translation lookaside buffer TLB 10 and a bus interface module 11 for interfacing with the central bus 6.

It should be understood that FIG. 1 is exemplary only and the invention is not limited to systems with only a single processor. The invention may also be implemented in systems with a plurality of processors. Moreover, the non-volatile disk 5 may be connected to the I/O subsystem 7 instead of the central bus 6. The non-volatile disk 5 may, for example, be accessed over a network and located at a remote location.

Figure 2:
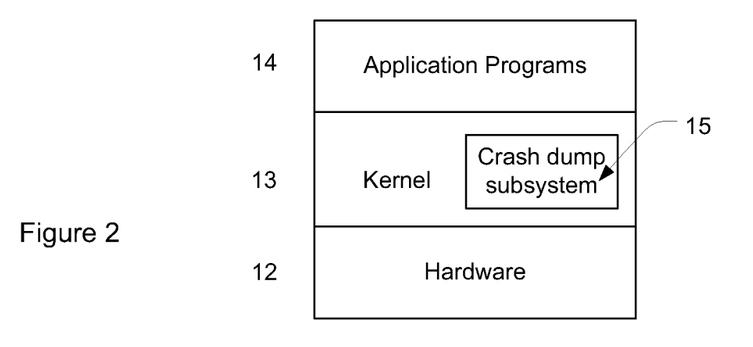
FIG. 2 is a high-level overview of a computer system illustrating the interrelationship between software and hardware.

FIG. 2 is a high-level overview of a computer system illustrating the interrelationship between software and hardware. The system includes a hardware level 12, a kernel 13 and a user level 14. The hardware level 12 includes the hardware system elements shown in FIG. 1, the kernel 13 is the part of the operating system that controls the hardware and the user level 14 includes the application programs that are being run on the computer. The processor runs one or more processes, which can be defined as programs in execution. Processes in turn generally run as a number of threads, where a thread is an entity within a process that can be scheduled for execution by an operating system scheduler. The kernel 13 also includes a crash dump subsystem 15 which will be described in more detail below.

The cache 9, main memory 3 and hard disk 4 shown in FIG. 1 are all capable of storing program instructions and data, generally referred to together as data. The data can also be stored on external devices accessed through the I/O subsystems 7. One of the tasks of the kernel 13 is to manage the access to the memory resources. To execute a process or a thread, the data required for that process or thread must reside in the main memory 3, also referred to as physical memory, at the time of execution so that it is available to the CPU 8. Once the kernel 13 itself is loaded into memory at boot-up, it ensures that any other data required for running a desired process or thread is brought into physical memory 3. However, the amount of RAM is limited and if all the data associated with a particular program is made available in the RAM at the outset, the system could only run a limited number of programs. Modern operating systems such as HP-UX™ therefore operate a virtual memory management system, which allows the kernel to move data and instructions from the hard disk 4 or external memory devices to RAM 3 when needed and move it back when not needed any longer. The total memory available is referred to as virtual memory and can exceed the size of the physical memory. Some of the virtual memory space has corresponding addresses in the physical memory. The rest of the virtual memory space maps onto addresses on the hard disk 4 and/or external memory device. Hereinafter, any reference to loading data from the hard disk into RAM should also be construed to refer to loading data from any other external memory device into RAM, unless otherwise stated.

When a program is compiled, the compiler generates virtual addresses for the program code that represent locations in memory. When the operating system then tries to access the virtual addresses while running the program, the system checks whether a particular address corresponds to a physical address. If it does, it accesses the data at the corresponding physical address. If the virtual address does not correspond to a physical address, the system retrieves the data from the hard disk 4 and moves the data into the physical memory 3. It then accesses the data in the physical memory in the normal way. If there is not enough available memory in the physical memory, used memory has to be freed and the data and instructions saved at the addresses to be freed is moved to the hard disk 4. Usually, the data that is moved from the physical memory is data that has not been used for a while.

A page is the smallest unit of physical memory that can be mapped to a virtual address. For example, on the HP-UX™ system, the page size is 4 KB. Virtual pages are therefore referred to by a virtual page number VPN, while physical pages are referred to by a physical page number PPN. The process of bringing virtual memory into main memory only as needed is referred to as demand paging.

Figure 3:
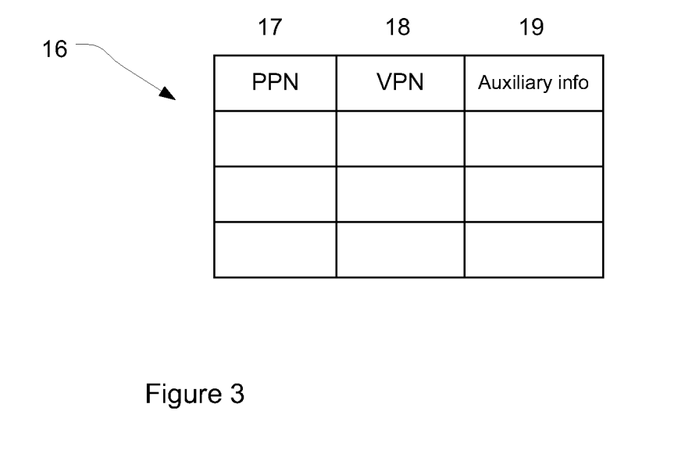
FIG. 3 illustrates the structure of a page directory for translating virtual memory addresses into physical memory addresses.

With reference to FIG. 3, to manage the various kinds of memory and where the data is stored, an operating system, such as HP-UX™ maintains a table in memory called the Page Directory (PDIR) 16 that keeps track of all pages currently in memory. When a page is mapped in some virtual address space, it is allocated an entry in the PDIR. The PDIR links a physical page in memory to its virtual address. Every entry in the PDIR 16 contains a field 17 with the physical page number, a field 18 with the virtual page number and at least one field 19 with at least one bit of auxiliary information about the page of memory.

The PDIR 16 is saved in RAM 3. To speed up the system, a subset of the PDIR is stored in the TLB 10 in the processor 2. The TLB translates virtual to physical addresses. Therefore, each entry contains both the virtual page number and the physical page number.

The invention is not restricted to use of the hashed page table arrangement shown in FIG. 3, but is applicable to systems using other types of page table, such as a linear hierarchical page table.

Figure 4:
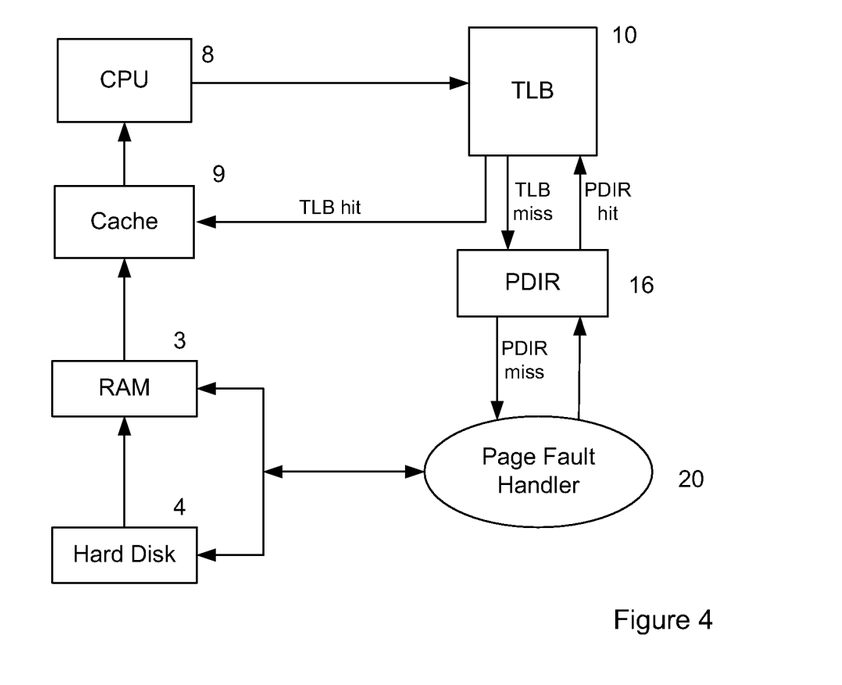
FIG. 4 illustrates a mechanism used to translate between virtual and physical addresses in a virtual memory management system.

With reference to FIG. 4, when the CPU 8 wishes to access a memory page, it first looks in the TLB 10 using the VPN as an index. If a PPN is found in the TLB 10, which is referred to as a TLB hit, the processor knows that the required page is in the main memory 3. The required data from the page can then be loaded into the cache 9 to be used by the CPU 8. A cache controller (not shown) may control the process of loading the required data into the cache 9. The cache controller will check whether the required data already exists in the cache 9. If not, the cache controller can retrieve the data from the RAM and move it into the cache. The cache 9 may be either physically or virtually indexed.

If the page number is not found in the TLB, which is referred to as a TLB miss, the PDIR 16 is checked to see if the required page exists there. If it does, which is referred to as a PDIR hit, the physical page number is loaded into the TLB 10 and the instruction to access the page by the CPU is restarted again. If it does not exist, which is generally referred to as a PDIR miss, this indicates that the required page does not exist in physical memory 3, and needs to be brought into memory from the hard disk 4 or from an external device. The process of bringing a page from the hard disk 4 into the main memory 3 is dealt with by a software page fault handler 20 and causes corresponding VPN/PPN entries to be made in the PDIR 16 and TLB 10, as is well known in the art. When the relevant page has been loaded into physical memory, the access routine by the CPU is restarted and the relevant data can be loaded into the cache and used by the CPU 8.

When the operating system crashes, it is often desirable to save the data in the physical memory to a disk such that it can be analysed later and the cause of the crash can be identified. The system can then be restarted. The process of saving data to disk at the time of crash will hereinafter be referred to as a crash dump. The data saved may include the memory image of a particular process, the memory image of parts of the address space of that process along with other information such as the values of the processor registers. The crash dump is performed in the crash dump subsystem 15 of the kernel and like any other application requires memory for its operations. This memory has to be allocated from the physical memory 3. High performance crash dump algorithms include compression, parallel I/O, encryption and access to remote storage locations for dumping the data. High performance crash dumps require a large amount of memory for the compression and encryption dictionaries, compression buffers and I/O buffers.

Figure 5:
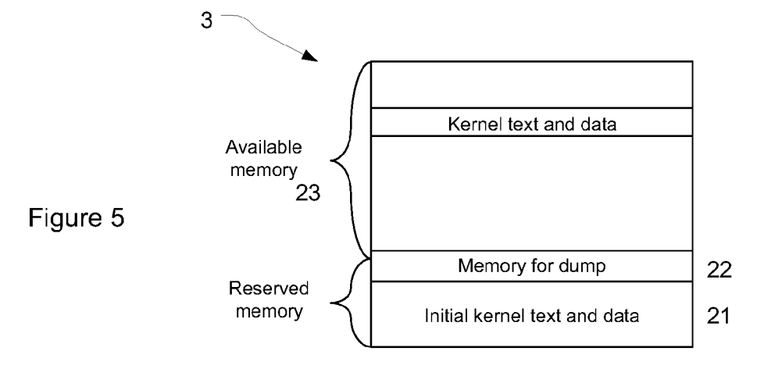
FIG. 5 illustrates a typical partition of physical memory in the data processing system.

FIG. 5 illustrates the allocation of physical memory for the kernel, for the crash dump and for user processes. A small amount of memory is reserved by the kernel at boot-up. A portion of this amount 21 includes kernel text, i.e. instructions for carrying out essential processes of the kernel, and initial data. The kernel text and initial data must reside in memory until the operating system shuts down and cannot be swapped out to make room for pages required for user processes. Another portion 22 of the memory reserved at boot-up is allocated for the crash dump. The memory 23 that is not reserved by the kernel at boot-up can be used for mapping virtual memory pages during run-time. The kernel keeps a record of all the available ranges of memory in the form of a physical memory map. The physical memory map is an array of structures in which each structure specifies a physical starting address of an available range of memory and the number of contiguous physical pages from that address that are available. Some of this memory will be allocated for kernel processes as and when the memory is needed. Consequently, the kernel data structures are not all located at consecutive memory addresses. As such, the system cannot easily identify the location of pages that store important kernel data structures at crash time and determine which pages must not be reused for performing the crash dump.

The amount of memory 22 allocated at boot-up for the crash dump, according to the invention, is much smaller than the memory required to run the actual dump and much smaller than the amount that would be allocated in a conventional dump. According to the invention, a large proportion of the memory required for the dump is allocated after the crash from memory available to be used by other processes during run-time. The process for allocating memory at the time of the crash will be described in more detail below.

Figure 6:
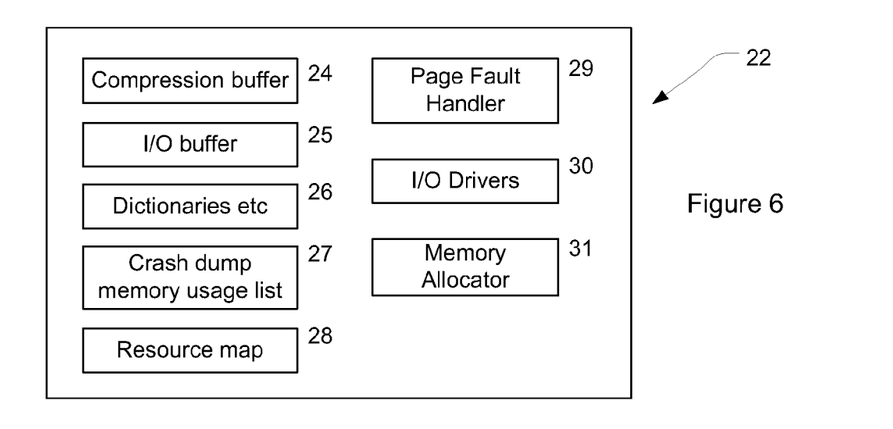
FIG. 6 is a schematic diagram of the uses of the memory initially allocated for performing a crash dump.

With reference to FIG. 6, the memory 22 allocated for the crash dump at boot-up includes an initial compression buffer 24, an initial I/O buffer 25, a memory area 26 for storing the compression dictionaries, encryption dictionaries and other necessary data and an array 27 for storing a list of memory locations comprising data structures that are required for performing the dump. This array will be referred to as the crash dump memory usage list hereinafter. The list is populated at crash time as will be described with respect to FIG. 9. The memory 22 also comprises an internal resource map 28, instructions for a special crash dump page fault handler 29, instructions for I/O drivers 30 used by the crash dump and instructions for an internal memory allocator 31. It should be understood that if the invention is implemented in an apparatus with a pageable kernel, i.e. in which kernel data and code can be paged on demand, at least some of the data structures of memory 22 can be loaded into physical memory at the time of the crash, rather than at boot-up.

Figure 7:
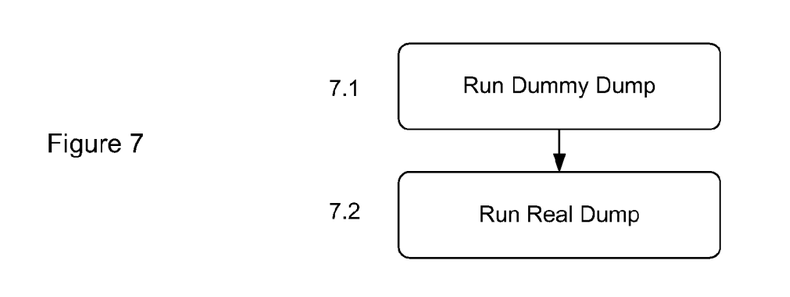
FIG. 7 is a flowchart illustrating the two-step crash dump according to the invention.

With reference to FIG. 7, when the system crashes the kernel instructs the dump subsystem 15 to perform a two-stage crash dump. First, a dummy crash dump is run at step 7.1 to identify the pages that are used internally by the crash dump for its correct running, then the real dump is run at step 7.2 using memory allocated from memory ranges that do not include the pages that are required to perform the dump. Both dump routines loop through the physical memory map but only the second one actually saves the memory to non-volatile storage 5. The dummy crash dump will be described in more detail with respect to FIGS. 8 and 9 and the real dump will be described in more detail with respect to FIGS. 10 and 11.

Figure 8:
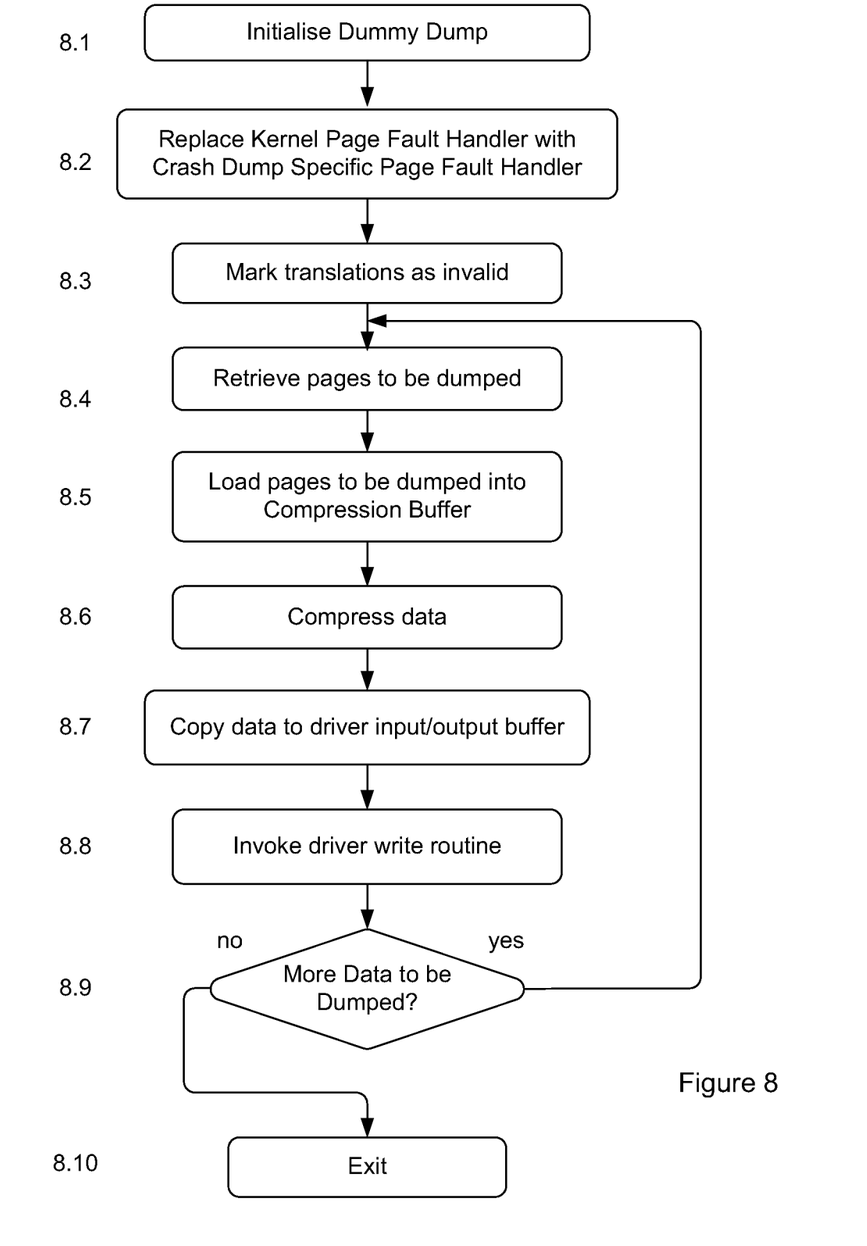
FIG. 8 is a flowchart illustrating a dummy crash dump routine.

With reference to FIG. 8, the dummy crash dump routine is initialised at step 8.1. A dummy crash dump routine is a crash dump modified such that no input or output to the non-volatile disk 5 is performed. It invokes all the driver I/O routines and iterates through the dump algorithm fully except that the I/O is not performed. The dummy dump may also be run in a low memory operating mode, which means that much smaller data sizes are used at the cost of the special improvements provided by the dump algorithm, such as reduced dump time, compression and encryption.

At step 8.2, the kernel page fault handler is replaced with the specific crash dump page fault handler 29. At step 8.3, the bits 19 of the PDIR 16 containing auxiliary information are used to mark all translations in the PDIR 16 as invalid. The TLB 10 is also updated to reflect the changes in the PDIR 16. The purpose of steps 8.2 and 8.3 will be described in more detail with respect to FIG. 9.

At step 8.4, the crash dump subsystem 15 retrieves the page numbers of the first set of pages listed in the physical memory map. At step 8.5, data from the retrieved pages is then read into the compression buffer 24 and at step 8.6, the data is compressed. Considering that the memory allocated for the dump is relatively small, the number of pages compressed at a time must also be small. At step 8.7, the compressed data is then copied from the compression buffer to the input/output buffer 25. At step 8.8, the I/O drivers 30 are invoked but the data in the input/output buffers is never actually written to disk 5. For example, in one embodiment, the I/O drivers 30 may instruct a Direct Memory Access (DMA) controller to write the data as is well known in the art. However, when the dump is a dummy dump, the I/O drivers 30 never pass the instruction to the DMA controller to write the data.

At step 8.9, the kernel subsystem 15 then checks if the routine has looped through all the pages in the physical memory map. If not, steps 8.3 to 8.9 are repeated until all the pages in the physical memory map have been processed. When all the pages in the physical memory map have been processed, the routine exits at step 8.10.

Not all the physical memory must necessarily be dumped. For example, unused pages, user process pages and kernel code pages may not be dumped by default. In some operating systems, the crash dump subsystem 15 may check user settings to identify the data to be included in the dump. Alternatively, the physical memory map may include an indication of which pages should be dumped. For example, the system may keep track of what each memory range, rather than each page, is used for and only the memory ranges that include data of certain types or associated with certain processes may be included in the dump. The steps of FIG. 8 are only visited for the pages that contain data to be dumped.

Throughout steps 8.1 to 8.10, crash dump data structures and other kernel data structures are accessed, including data structures apart from the data to be dumped. Since the dummy dump invokes similar routines to the real dump, the accessed kernel memory and data structures are also required for the real dump. Therefore, the pages storing the kernel memory and data structures are not safe to be used for allocating memory for running the real dump. Whereas the data to be dumped is accessed using its associated physical page numbers stored in the physical memory map, the kernel memory and data structures are accessed using their associated virtual page numbers as explained with reference to FIG. 3. However, since the translations between the physical page numbers and the virtual page numbers in the PDIR 16 have been marked as invalid, the first time a page is accessed using its virtual page number using the crash dump subsystem, the special crash dump fault handler 29 is invoked. The crash dump fault handler 29 is also invoked if a translation is found to be marked as invalid in the TLB 10.

Figure 9:
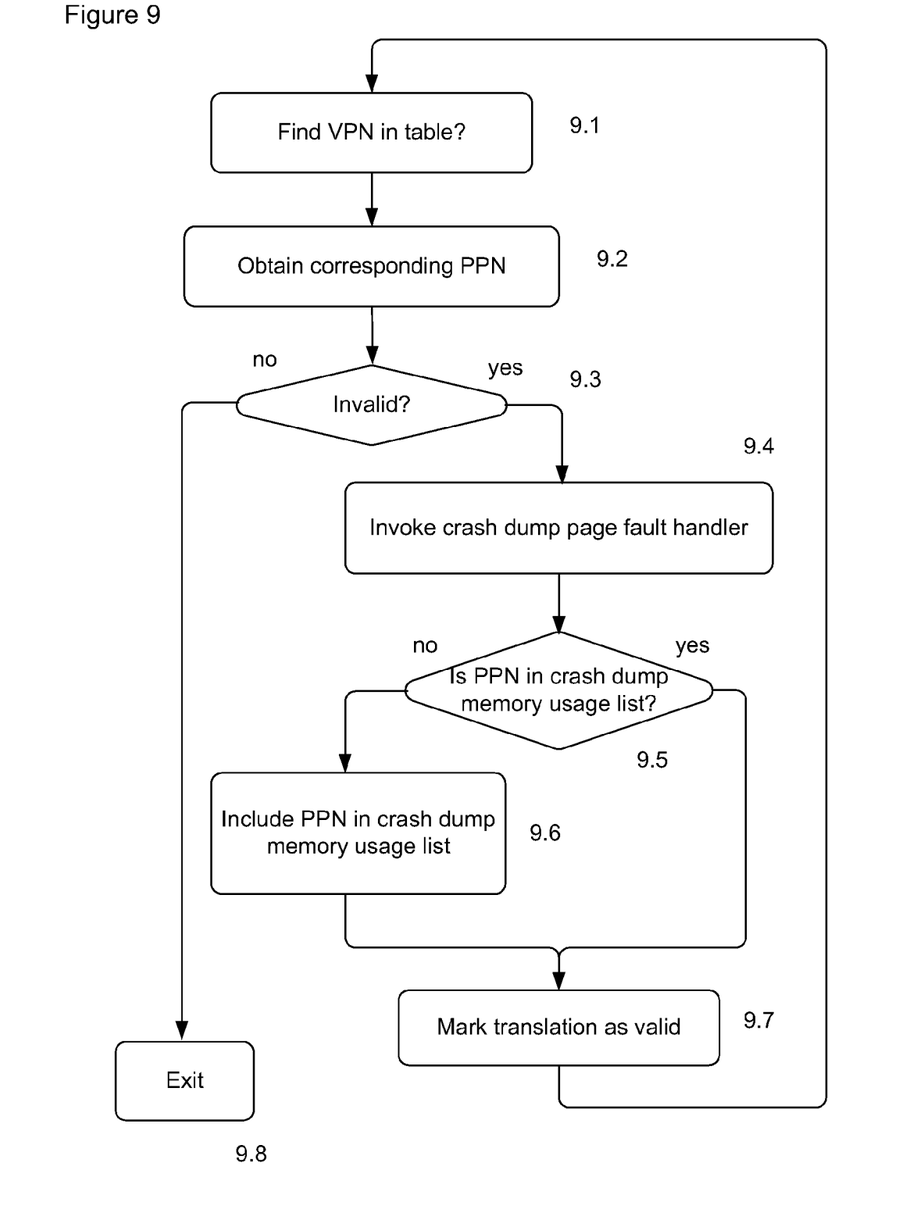
FIG. 9 is a flowchart illustrating a process for identifying memory that is not safe to be reused for the crash dump.

In more detail, with reference to FIG. 9, each time a virtual page number is accessed by the dummy crash dump routine, the CPU searches for the VPN in the TLB or in the PDIR at step 9.1. The corresponding PPN is found at step 9.2 and at step 9.3 it is checked whether the auxiliary bit 19 in the PDIR 16, or an auxiliary bit in the TLB, indicates whether the translation is valid. If the translation is invalid, the process continues to step 9.4 and the crash dump fault handler 29 is invoked. The special crash dump fault handler checks whether the PPN is present in the crash dump memory usage list 27 at step 9.5. If the physical page number is not included, the physical page number is saved at step 9.6 and the translation in the PDIR 16 is then marked as valid at step 9.7. The instruction to translate the address is then restarted, the CPU finds the physical page number at step 9.2, checks that the translation is valid at step 9.3 and exits at step 9.8.

If at step 9.5, it is determined that the physical page number is already in the crash dump memory usage list 27, for example because it has already been accessed in the dummy dump routine through another virtual page number mapping onto the same physical page number, referred to as virtual aliasing, the process continues directly to step 9.7, the translation is marked as valid and the instruction to access the page is restarted.

As mentioned above, the actual physical pages to be dumped are accessed using their physical addresses and no translations are carried out. Therefore these accesses do not result in page faults. Alternatively, the pages may be accessed using their virtual page numbers but the process for accessing the memory may be modified such that the auxiliary bits 19 are not checked or the invalid flags of the translations are ignored. Therefore, the access to these pages does not result in page faults and the physical page numbers are not stored in the list 29. Consequently, the crash dump memory usage list 29 only includes the physical page numbers of pages used by the crash dump subsystem 15 to perform the routines of the dump. A method of accessing the pages to be dumped without invoking the crash dump page fault handler can be implemented in various known ways and will not be described in detail herein.

Figure 10:
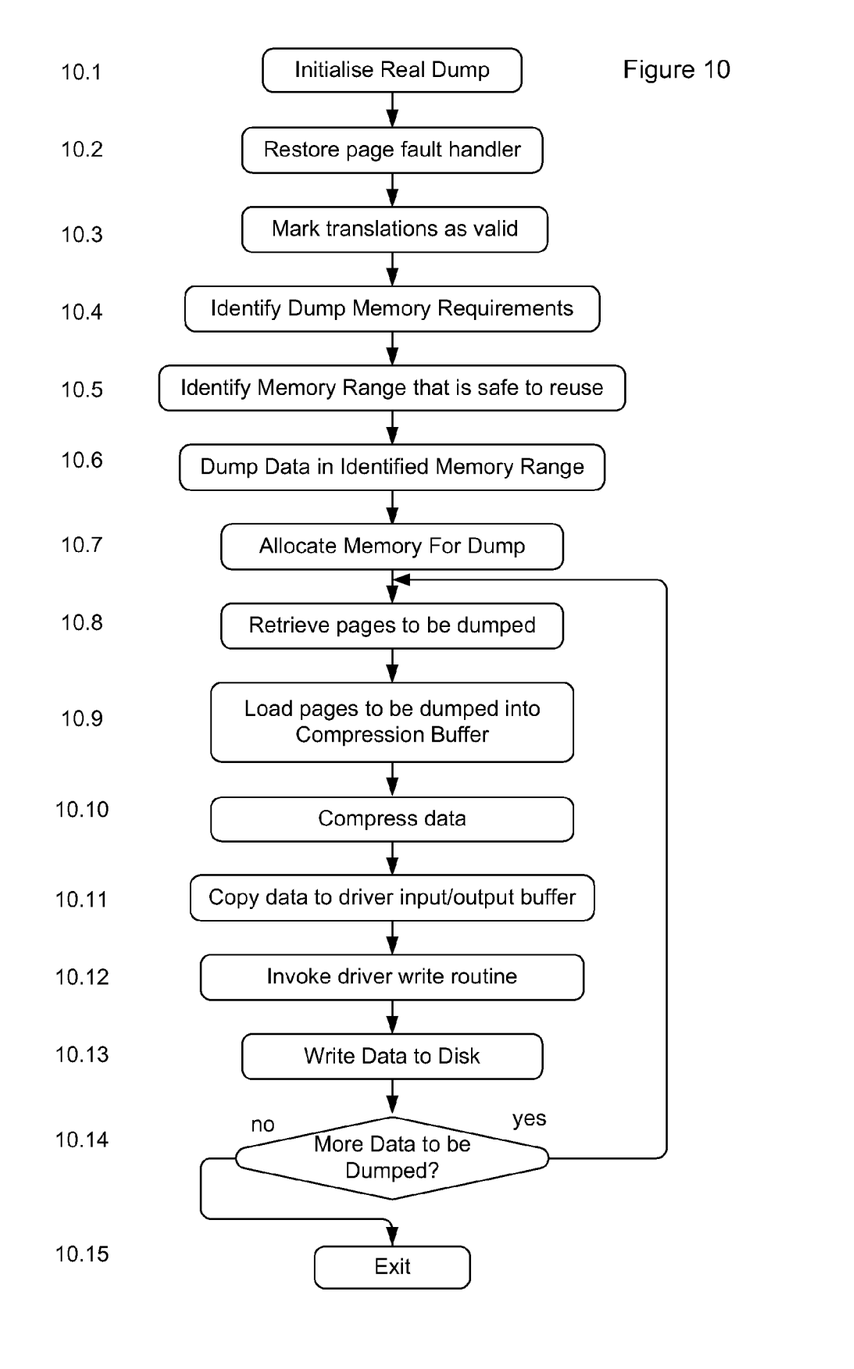
FIG. 10 is a flowchart illustrating a process for performing a crash dump routine.

With reference to FIG. 10, the real dump is then initialised at step 10.1. At step 10.2, the kernel page fault handler is restored. At step 10.3, all remaining invalid entries in the PDIR table 16 are marked as valid. The memory needs for running the dump are then identified as well known in the art at step 10.4 and the memory ranges that can be reused for allocating memory are identified at step 10.5 as will be described in more detail with respect to FIG. 11.

The data already stored in the memory range that is safe to reuse must be dumped before the memory can be allocated to the crash dump subsystem 15. At step 10.6, the data in the memory range that is safe to be reused for the dump is saved to non-volatile storage 5. The dump of the data is performed using the initial compression buffer 24 and the initial I/O buffer 25. The pages are then marked as dumped in the physical memory map such that the crash dump subsystem 15 does not attempt to dump the data again. The memory range is now free to be reused and at step 10.7, larger compression and input/output buffers to replace the initial compression and input/output buffers are allocated from the memory range. If parallel dumps are supported by the kernel, a plurality of input/output buffers may be created. Additionally, if multithreaded compressed dumps are supported by the kernel, a plurality of compression buffers may be created.

The main dump is then started at step 10.8. The dump can now be performed in normal mode because enough memory is available. The next set of pages in the physical memory map to be dumped is identified at step 10.8 and at step 10.9 the data contained in the pages is moved to the newly allocated compression buffer. The data is then compressed at step 10.10 and copied to the input/output buffer at step 10.11. At step 10.12 the driver routines 30 are invoked. This time, the driver routines instruct the DMA controller at step 10.13 to write the data in the I/O buffers to the non-volatile crash dump disk 5. The pages are then marked as dumped in the physical memory map. At step 10.14 it is checked whether there are any remaining pages in the physical memory map that are not marked as dumped. If there are, steps 10.8 to 10.14 are repeated for the remaining pages until all the pages in the physical memory map have been dumped. When all the pages have been dumped, the dump exits at step 10.15.

Step 10.5 will now be described in more detail with respect to FIG. 11. At step 11.1, the crash dump subsystem 15 invokes the internal crash dump memory allocator routines 31. The memory allocator accesses the physical memory map at step 11.2. As shown in FIG. 5, a portion 21 of the memory comprises kernel static data and text segments that are loaded into the memory at boot up. The data in this portion of the memory is required for the kernel to run and although some of the memory could be reused for running the crash dump it is safest to avoid reusing it. Therefore, at step 11.3, the memory allocator iterates through the kernel static data and text segments that are loaded into memory at boot up in memory area 21 and identifies the highest physical page used for kernel static data and text segments and, at step 11.4, the memory allocator searches above the highest physical page used for kernel static data and text segments for the largest range of pages that does not include any pages in the crash dump memory usage list 27. The memory allocator then initialises its own resource map 28 with the identified range. The data in the identified range can then be dumped and reused as described with respect to steps 10.6 and 10.7 in FIG. 10.

Figure 11:
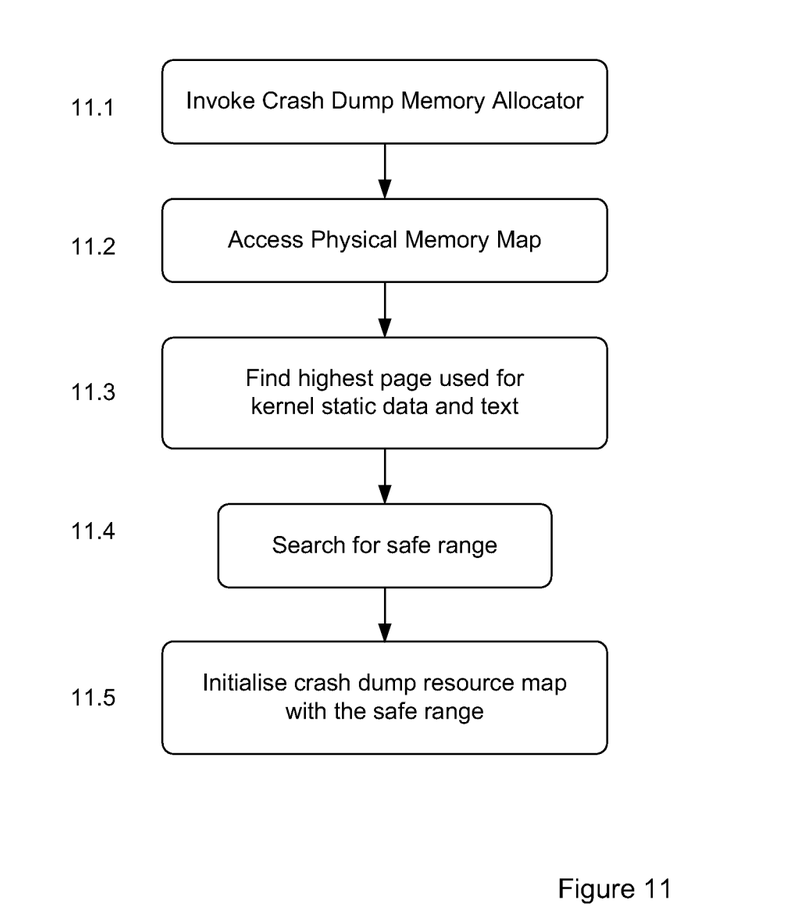
FIG. 11 is a flowchart illustrating a process for identifying a memory range that is safe to be reused for the crash dump.

It should be understood that the process described with respect to FIG. 11 constitutes just one example of a process for identifying a memory range that is safe to be reused. The details of this process can be varied. For example, step 11.3 may not be performed and the portion of memory 21 reserved for kernel static data and text segments may also be searched for a memory range that is safe to reuse for the crash dump routine.

In one embodiment, the dummy crash dump routine and the real crash dump routine are implemented using software. The kernel may call a crash dump function that takes two variables, a variable indicating whether the dump is a dummy dump or a real dump and a variable pointing to the resource map used for identifying data to be dumped. Whether the initial buffers or the buffers allocated at crash time are accessed is determined in dependence on the value of the variable indicating whether the dump is a dummy dump or a real dump. The function may also pass the variable to the driver routines which in turn determines based on the value of the variable whether to instruct the DMA controller to write the data to be dumped to non-volatile storage or not. The memory for the actual dump may be allocated using the C function malloc( ), which is well known in the art. In one embodiment, a special crashdump_malloc( ) function may be provided. This function may be written to allocate memory from the internal crash dump memory resource map.

An algorithm, according to one embodiment of the invention, for performing the crash dumps is provided below:

```
Dumpsys(FakeDump, PhysicalMemoryMap[ ])
  If (FakeDump is TRUE)
    Replace Kernel Page Fault handler with crash dump specific
    handler, crashdump_pagefault_handler( ) and mark
    translations as invalid
  Else
    Restore Kernel Page Fault handler and mark translations as
    valid
    Identify memory needs during crash dump, "MemReq", for
    operating in normal mode (i.e multi-threaded mode)
    Identify memory ranges that can be reused for allocating upto
    "MemReq". Initialize the memory resource map
    crashdump_malloc_rmap_init( )
    Save (dump) ranges of memory identified for reuse to the disk
    using initial buffers BFC_X and DRV_X.
    Allocate bigger buffers (many instances for a parallel dump)
    crashdump_malloc(BFC_Y)
    crashdump_malloc(DRV_Y)
    Mark ranges in crashdump_rmap[ ] as dumped or remove
    them from the PhysicalMemoryMap[ ].
  DumpLoop: Loop PhysicalMemoryMap[ ] Until All Data is Dumped
    Begin
      If (FakeDump is TRUE)
        Identify memory area MA_X to be dumped
      Else
        Identify memory area MA_Y to be dumped
      If (FakeDump is TRUE)
        Read data, DA_X, from memory area MA_X to be
        dumped into compression buffer BFC_X
      Else
        Read data, DA_Y, from memory area MA_Y to be
        dumped into compression buffer BFC_Y
      If (FakeDump is TRUE)
        compress data using compression buffer BFC_X
      Else
        compress data using compression buffer BFC_Y
      If (FakeDump is TRUE)
        Copy compressed data from BFC_X to DRV_X
      Else
        Copy compressed data from BFC_Y to DRV_Y
      Invoke driver write routine and write compressed data to disk:
      If (FakeDump is TRUE)
        DriverWrite(FakeWrite = TRUE, DRV_X)
```

-continued

```
    Else
        DriverWrite(FakeWrite = FALSE, DRV_Y)
        If (all required data is dumped)
            Exit
        Else
            GoTo DumpLoop
End
```

In the above algorithm, DriverWrite( ) starts DMA only when FakeWrite is FALSE.

The algorithm for the Page Fault Handler, in one embodiment, is provided below:

```
crashdump_pagefault_handler( )
    Get Fault Virtual Address, "fva", from processor special registers
    Get Physical page, "pfn", corresponding to Fault Virtual Address,
    "fva"
    If (pfn not present in crashdump_memory_usage[ ])
        save "pfn" in crashdump_memory_usage[ ]
```

The algorithms for the functions carried out by the memory allocator is provided below:

```
crashdump_malloc_rmap_init( )
    Iterate thru Kernel static data, text segments and identify highest
    physical page used, kernel_static_phys_max.
    Iterate physical memory map of kernel, and start search above
    kernel_static_phys_max to identify biggest range of pages, which
    are not present in crashdump_memory_usage[ ].
    Initialize resource map crashdump_rmap[ ] with above ranges
crashdump_malloc( )
    Allocate memory from crashdump_rmap[ ].
```

Although the invention has been described with respect to a specific embodiment above, variations are possible.

For example, instead of marking the bit 19 comprising auxiliary information in the PDIR 16 as invalid, the pages that contain kernel data structures required for the dump can be logged by using some other page protection mechanism to invoke the fault handler. For example, protection keys or task identifiers associated with a particular block of memory may be used instead of the invalid/valid bit in the page table. Protection keys and task identifiers, used for example in PA-RISC™ processors, will not be described in detail here since they are known in the art.

Moreover, it should be noted that in some operating systems the crash dump routine is run in real mode. In other words, no access or protection checks are performed. In that case, the dummy dump may be run in virtual mode such that the CPU performs access and protection checks and the actual dump may be run in real mode or physical mode for fail safe operation.

Additionally, the memory does not have to be divided into pages. Other types of segmentations of memory are also possible.

The invention provides a mechanism to allocate memory after system crash for dump purposes. Moreover, the mechanism requires less book keeping of memory than in the prior art. Moreover, by using the mechanism for allocating memory according to the invention, only a small amount of memory must be reserved during boot-up or run-time for initiating the crash dump routine. As a result, the apparatus uses memory more efficiently than in the prior art.

It should be noted that the time taken for the dummy crash dump to run does not extend the time taken for the crash dump process to complete significantly, because the time-consuming task of writing the data to non-volatile disk is not performed in the dummy crash dump routine.

Moreover, the time taken for the crash dump process to complete can sometimes be reduced further by not performing any compression or encryption as part of the dummy crash dump. The time taken for the crash dump process according to the invention is shorter than if the actual dump was performed with the smaller data sizes used in the dummy crash dump. Therefore, the invention allows more efficient use of memory without extending the time taken for the crash dump to complete significantly.

Although the crash dump algorithm has been described to include compression, the invention also has advantages when compression is not used. Any system with a crash dump algorithm that uses a significant amount of memory because it employs, for example, encryption or parallel I/O would provide inefficient use of memory if all the memory required for performing the dump is allocated at boot-up. According to the invention, a large proportion of the required memory can be allocated at the time of the crash instead. Memory used during run time for other processes can be reused at the time of the crash and memory is used more efficiently.

The invention claimed is:

1. A method of performing a crash dump of a memory in a data processing apparatus, the method comprising:
    running, by a processing unit within a hardware level, a first routine to generate a list of memory locations of the memory having data structures required for performing the crash dump;
    running, by the processing unit, a second routine, wherein the second routine includes:
        identifying a memory range of the memory that does not contain the listed memory locations;
        dumping data from a first portion of the identified memory range to a storage device;
        allocating memory locations from the first portion of the identified memory range as a buffer; and
        dumping, via the buffer, data from a remaining portion of the identified memory range to the storage device.

2. A method according to claim 1, wherein the first routine uses smaller data sizes than the second routine.

3. A method according to claim 1, wherein the running of the first routine is triggered by a kernel crash.

4. A method according to claim 1, wherein the data processing apparatus comprises a virtual memory management system, and wherein the first routine comprises creating a record of physical page addresses corresponding to virtual page addresses accessed by the first routine.

5. A method according to claim 4,
    wherein running the first routine further comprises invoking a page fault handler when a virtual page address is accessed, and
    wherein creating a record of the physical page addresses corresponding to the virtual page addresses is carried out by the page fault handler.

6. A method according to claim 5, further comprising marking all translations in a page table of the data processing apparatus as invalid to invoke the page fault handler during the first routine.

7. A method according to claim 1, wherein allocating memory as a buffer comprises allocating memory to be used for at least one compression buffer.

8. A method according to claim 1, wherein allocating memory as a buffer comprises allocating a plurality of buffers to be used for performing parallel input/output (I/O).

9. A method according to claim 1, wherein running the second routine comprises running at least one of compression algorithms, parallel input/output (I/O) operation algorithms, encryption algorithms, and algorithms to write to non-volatile storage over a network.

10. The method according to claim 1, wherein the identifying of a memory range that does not contain the listed memory locations further comprises:
identifying a highest physical memory page used for kernel static data and text segments; and
searching above the identified highest physical memory page for a largest memory range that does not include any of the listed memory locations.

11. A module for performing a crash dump of memory in a data processing apparatus, comprising:
a processing unit within a hardware level, the processing unit to run a first routine followed by a second routine,
wherein the first routine is to generate a list of memory locations of the memory having data structures required to perform a second routine; and
wherein the second routine is to:
identify a memory range of the memory that does not contain the listed memory locations;
perform a first data dump to dump data stored in the identified memory range to a storage device;
allocate memory locations from the identified memory range as a buffer; and
perform a second data dump to dump data, from the memory not previously dumped, to the storage device via the buffer.

12. A module according to claim 11, wherein the processing unit is to run the first routine using smaller data sizes than the second routine.

13. A module according to claim 11,
wherein the processing unit is to access the memory of the data processing apparatus using virtual memory addresses, and
wherein the module further comprises an internal memory to save physical addresses corresponding to virtual addresses accessed during the first routine.

14. A module according to claim 11, further comprising a page fault handler to save physical addresses corresponding to virtual addresses accessed by the first routine.

15. A module according to claim 14, wherein said processing unit is to mark all translations in a page table of the data processing apparatus as invalid to invoke the page fault handler during the first routine.

16. A module according to claim 11, wherein said processing unit is to dump data in the identified memory range to non-volatile storage prior to allocating memory from the identified memory range as the buffer.

17. A module according to claim 11, constituting a kernel.

18. The module according to claim 11, wherein to identify a memory range that does not contain the listed memory locations, the second routine is to:
identify a highest physical memory page used for kernel static data and text segments; and
search above the identified highest physical memory page for a largest memory range that does not include any of the listed memory locations.

19. An apparatus comprising:
a processing unit within a hardware level;
a memory;
a kernel executed by the processing unit;
a memory allocator executed by the processing unit to allocate a first portion of said memory to be used for a crash dump of a second portion of said memory when the kernel crashes; and
a crash dump module implemented by the processing unit to save said second portion of the memory to non-volatile storage when the kernel crashes, the crash dump module to:
identify kernel data structures in the memory when the kernel crashes;
identify the first portion of the memory as a memory range that does not include the identified kernel data structures;
perform a data dump from the first portion of the memory to the non-volatile storage;
cause the memory allocator to allocate the first portion of the memory as a buffer; and
perform a data dump from the second portion of the memory to the non-volatile storage via the buffer.

20. The apparatus according to claim 19, wherein to identify a memory range that does not contain the listed memory locations, the crash dump module is to:
identify a highest physical memory page used for kernel static data and text segments; and
search above the identified highest physical memory page for a largest memory range that does not include any of the listed memory locations.

* * * * *